(No Model.) 3 Sheets—Sheet 1.
G. F. WILSON.
HOT AIR FURNACE.

No. 438,667. Patented Oct. 21, 1890.

Witnesses:
A. Ruppert
C. H. Baker

Inventor
George F. Wilson
By Geo. M. Finckel
Attorney.

(No Model.) 3 Sheets—Sheet 2.

G. F. WILSON.
HOT AIR FURNACE.

No. 438,667. Patented Oct. 21, 1890.

Witnesses:
A. Ruppert,
Chas. H. Baker,

Inventor:
George F. Wilson
By, Geo. M. Finckel
Attorney.

(No Model.) 3 Sheets—Sheet 3.
G. F. WILSON.
HOT AIR FURNACE.
No. 438,667. Patented Oct. 21, 1890.
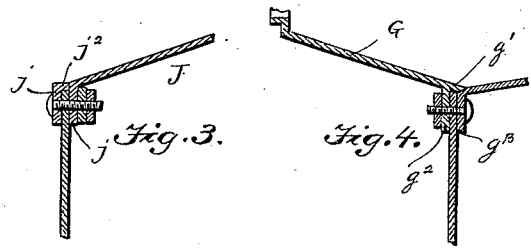
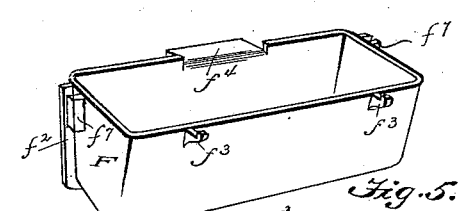
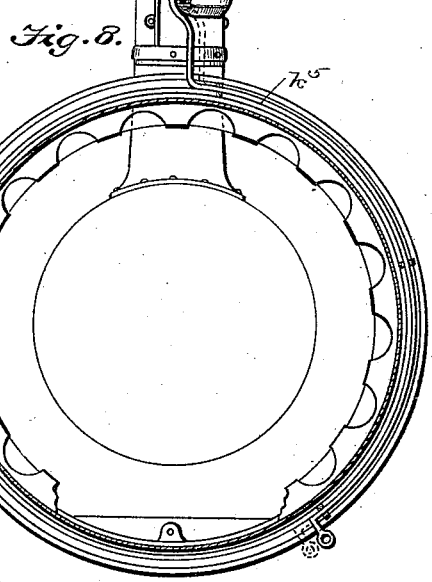
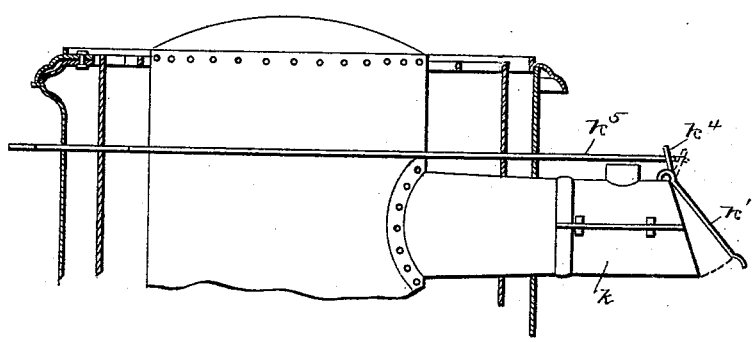
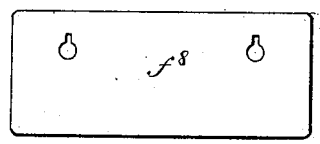
Witnesses:
A. Ruppert,
Chas. H. Baker,
Inventor:
George F. Wilson
By, Geo. M. Finckel
Attorney.

UNITED STATES PATENT OFFICE.

GEORGE F. WILSON, OF NEW CASTLE, PENNSYLVANIA.

HOT-AIR FURNACE.

SPECIFICATION forming part of Letters Patent No. 438,667, dated October 21, 1890.

Application filed January 28, 1890. Serial No. 338,417. (No model.)

*To all whom it may concern:*

Be it known that I, GEORGE F. WILSON, a citizen of the United States of America, residing at New Castle, in the county of Lawrence and State of Pennsylvania, have invented certain new and useful Improvements in Hot-Air Furnaces, of which the following is a specification, reference being had therein to the accompanying drawings.

My invention relates to hot-air furnaces, and has for its object to make certain improvements in the details of such furnaces whereby they are rendered more economical in construction, more easily operated, and more durable in use than those heretofore employed.

The particular features of novelty are defined in the claims at the end of this specification.

Figure 1:
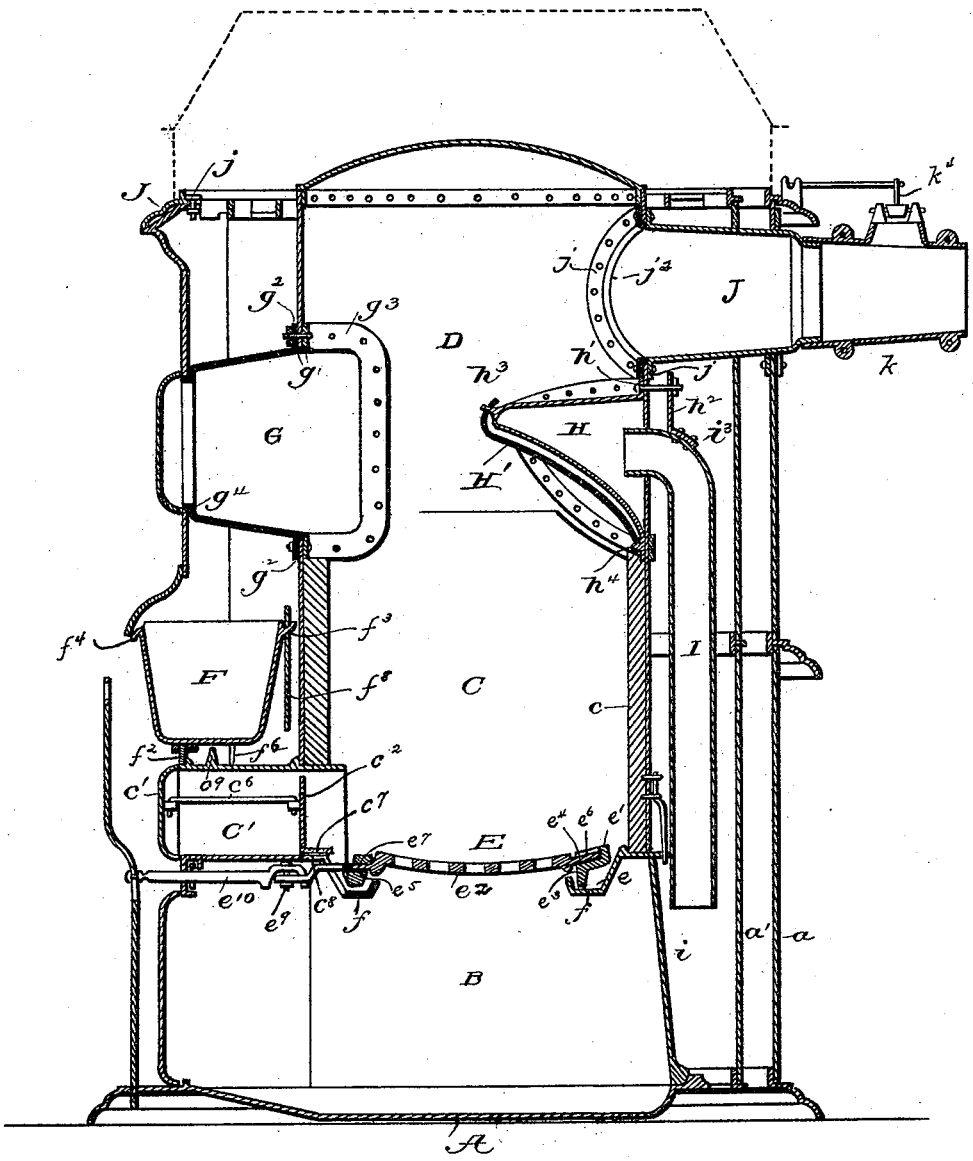
Figure 2:
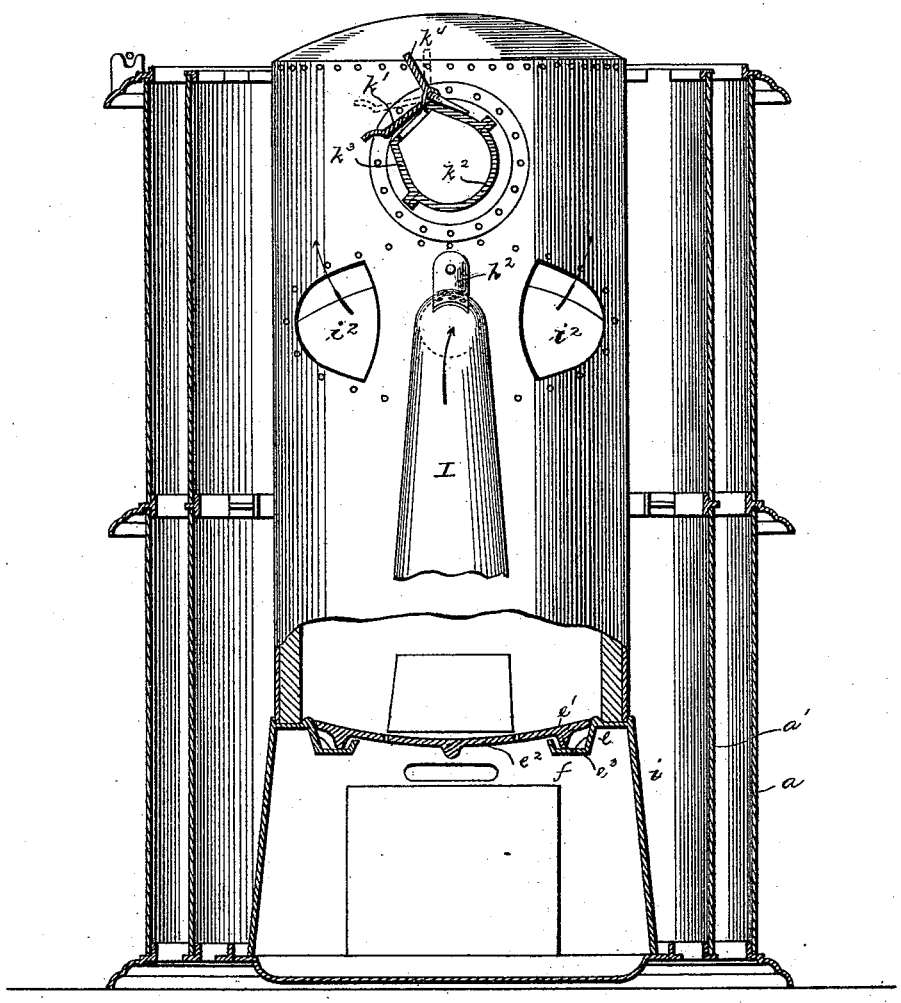

In the drawings annexed hereto, Figure 1 is a vertical section taken on a plane passing through the middle of the front and back of the stove. Fig. 2 is a view, partially in section, intended to illustrate the rear of the inner shell. Figs. 3 and 4 are sections illustrating two kinds of joints employed by me. Fig. 5 is a perspective view of the water-pan. Fig. 6 is a horizontal sectional view showing the grate and its supports. Fig. 7 illustrates in side view one form of check-draft; Fig. 8, a top view of another form of check-draft; Fig. 9, a detail view of the shield for the water-pan.

Like letters on the drawings designate corresponding parts in the different views.

A represents the base of the furnace, upon which the casings $a$ and $a'$ and the shell $i$ are supported.

B is the ash-pit, C the fire-box, and D the combustion-chamber, of the furnace.

The ash-pit B is provided with an opening at its top, in which is placed the grate E of circular form. (See Fig. 6.) The grate is supported upon a ring or support $e$, having radial fingers $f$, so as to permit its ready movement and removal. The grate is composed of two parts—namely, a main or body portion $e'$ and a removable center section $e^2$. The main portion $e'$ is formed with a depending annular flange $e^3$ and with bearings $e^4$ $e^5$, within which latter rest, respectively, the lug $e^6$ and shank $e^7$ of the center section of the grate. The shank $e^7$ is provided with a suitable opening and is so bent as to adapt it to be secured by means of a bolt or pin $e^9$ to a shaker-rod $e^{10}$, (see Fig. 1,) the latter being constructed to be engaged by a shaker. The center section $e^2$ of the grate is moved independently of the grate-body by turning the shank $e^7$ with a suitable shaker, and the entire grate is horizontally movable upon its support, as usual. The fire-box C is lined with ordinary fire-bricks $c$.

C' represents the clinker-box resting upon the top of the ash-pit and extending from the front of the furnace to the grate E. (See Fig. 1.) The clinker-box is provided with an outer door $c'$ and a hinged inner door $c^2$. The doors $c'$ and $c^2$ are connected together by a rod $c^6$, as clearly shown in Fig. 1, and the inner door is provided on its inner side with a flange $c^7$, which serves to cover the opening $c^8$ in the fire-box when the door is closed, and to uncover said opening when the door is open to allow clinkers to be dropped into the ash-pit, thus avoiding the necessity of withdrawing the clinkers through the clinker-box to the front of the furnace.

F represents a water-pan arranged to fit within an opening in the front of the furnace. The pan F (see Figs. 1 and 5) is formed with a flange $f^2$, extending around its sides and bottom, with a pair of rearwardly-projecting lugs or hooks $f^3$, with a front recess and lip $f^4$, bottom pins $f^6$, and side lugs $f^7$. The pin is supported at the bottom by the furnace-front and an upwardly-projecting lug $c^9$ on the clinker-box, and is held in place by the flange $f^2$, bottom fins $f^6$, and side lugs $f^7$. The pan may be readily removed when desired. The pan may also, if desired, be provided with a cover, hinged or otherwise attached thereto. The front recess or lip $f^4$ causes any overflow of water in filling to discharge at the front and outside of the furnace. The hooks $f^3$ are adapted to support a shield $f^8$, which may be used in case the water in the pan is likely to become too hot.

G represents the feed-box of the furnace, provided with the inner flange $g'$ and an annular flange $g^2$. The flange $g'$ projects within the shell of the furnace, as shown in Fig. 1, and the band $g^3$ rests upon the flange $g'$ within the shell, and is bolted or riveted to the band $g^2$, thus insuring a tight connection of the parts. The outer end of the feed-box is formed with an annular shoulder $g^4$, which fits within the opening of the furnace-front.

H represents what I term a "radiator," but what may also be called an "air-heating chamber." As shown, it is a shell of concavo-convex form and preferably made of heavy cast-iron. This radiator-shell or air-heating chamber extends inwardly over the combustion-chamber D, and is formed with a flange $h'$, bearing against the inner surface of the combustion-chamber and bolted to an outer frame $h^2$, to insure a strong joint. The radiator is provided with projecting pins $h^3$ and lugs $h^4$, which support a shield $H'$, to protect the radiator from the flames and intense heat in the combustion-chamber.

I represents a cold-air duct extending from near the base of the furnace into the rear of the air-heating chamber or radiator H, which latter is cut away or provided with openings $i^2$, to allow the air which has been heated to escape into the space $i^3$, whence it is conveyed to places for use.

J represents the smoke-collar formed with an annular flange $j$, resting against the shell and secured by a ring $j'$, formed with an annular flange $j^2$, which extends through the smoke-opening in the shell and connects with the collar J and is securely bolted to the flange $j$.

My improved check-draft consists of the cylinder $k$, the hinged valve $k'$, and its operating devices. The cylinder $k$ is formed in two sections $k^2$ and $k^3$, the latter of which is formed with an opening covered by a hinged cover or valve $k'$. The two sections of the cylinder are usually bolted together and attached to the smoke-collar, as shown. The cover $k'$ is formed with an arm $k^4$, to which is connected a rod $k^5$, extending around to the front of the furnace, where it is provided with a hand-pull $k^6$, by which the cover or valve may be opened or closed. The weight of the rod $k^4$ is such that it counterbalances the weight of the cover $k'$, and thus when the latter is raised it will be held in that position until the rod is again operated. The hand-pull, it will be observed, rests in suitable guides on the top ring of the furnace.

I claim—

1. In a furnace, a clinker-box arranged above the ash-pit and made with an opening for the passage of clinkers into the said ash-pit, a vertically-arranged door $c^2$, hinged at one side of the clinker-box and adapted to close the passage through said box, and an inwardly-projecting horizontal flange $c^7$ on the lower edge of said door, adapted to close the opening in the clinker-box communicating with the ash-pit, substantially as described.

2. The combination, with a furnace formed with a pan-opening, of a water-pan adapted to be supported within said opening and provided with rearwardly-projecting hooks or lugs and a shield supported on said lugs or hooks, substantially as described.

3. In a furnace, the combination, with the shell, of a radiator bolted to the latter and provided with hooks, as described, in combination with a shield secured by said hooks, substantially as described.

4. In a hot-air furnace, the combination, with a radiator bolted to the shell of the furnace within the combustion-chamber, of a cold-air pipe extending into said radiator through openings in the shell and openings in said shell on each side of the cold-air pipe for the exit of heated air from the radiator, substantially as described.

5. The combination, with the smoke-collar, of a sectional cylinder provided with an opening and a hinge-cover, the latter having a projecting arm, a rod connected to said arm and adapted to counterbalance the weight of said cover, and a curved hand-pull resting upon guides on the top ring of the furnace and extending around so as to be operated from the front of the furnace, substantially as described.

In testimony whereof I affix my signature in presence of two witnesses.

GEORGE F. WILSON.

Witnesses:
G. W. McMEEKEN,
J. W. CLARKE.